US007796466B2

(12) United States Patent
Combee et al.

(10) Patent No.: US 7,796,466 B2
(45) Date of Patent: Sep. 14, 2010

(54) APPARATUS, SYSTEMS AND METHODS FOR SEABED DATA ACQUISITION

(75) Inventors: Leendert Combee, Oslo (NO); Nicolas Goujon, Oslo (NO); Kenneth E. Welker, Nesøya (NO); Svein Arne Frivik, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 759 days.

(21) Appl. No.: 11/638,619

(22) Filed: Dec. 13, 2006

(65) Prior Publication Data

US 2008/0144442 A1 Jun. 19, 2008

(51) Int. Cl.
*G01V 1/38* (2006.01)

(52) U.S. Cl. ......................... 367/15; 367/134

(58) Field of Classification Search ............... 367/15, 367/19, 20, 134
See application file for complete search history.

(56) References Cited

U.S. PATENT DOCUMENTS

| | | | | |
|---|---|---|---|---|
| 4,805,160 A * | 2/1989 | Ishii et al. | ............ | 367/134 |
| 5,189,642 A | 2/1993 | Donoho et al. | | |
| 5,253,223 A * | 10/1993 | Svenning et al. | ............ | 367/178 |
| 5,303,207 A * | 4/1994 | Brady et al. | ............ | 367/134 |
| 5,432,754 A * | 7/1995 | Brady et al. | ............ | 367/134 |
| 5,568,005 A | 10/1996 | Davidson | | |
| 5,665,487 A | 9/1997 | Dhanji | | |
| 5,894,450 A * | 4/1999 | Schmidt et al. | ............ | 367/134 |
| 6,625,083 B2 | 9/2003 | Vandenbroucke | | |
| 6,842,006 B2 * | 1/2005 | Conti et al. | ............ | 324/350 |
| 6,932,185 B2 * | 8/2005 | Bary et al. | ............ | 181/122 |
| 6,975,560 B2 * | 12/2005 | Berg et al. | ............ | 367/16 |
| 7,016,260 B2 * | 3/2006 | Bary | ............ | 367/15 |
| 7,224,641 B2 * | 5/2007 | Nas | ............ | 367/15 |
| 2002/0110048 A1 | 8/2002 | Vandenbroucke | | |
| 2003/0117893 A1 * | 6/2003 | Bary | ............ | 367/16 |
| 2006/0256652 A1 * | 11/2006 | Thomas | ............ | 367/15 |

FOREIGN PATENT DOCUMENTS

| | | |
|---|---|---|
| EP | 1674888 A2 | 6/2006 |
| GB | 2424954 A1 | 10/2006 |
| WO | WO 2005071442 A2 | 8/2005 |

OTHER PUBLICATIONS

"Compact tidal generator could reduce the cost of producing electricity from flowing water," *Engineering and Physical Sciences Research Council*, 2006.
URL at http://www.nrl.navy.mil/techtransfer/exhibits/pdfs/Info%20Sheet%20pdfs/Material%20Info%20Sheets/PUPS.pdf.
PCT Search Report, dated Nov. 10, 2008, for Application No. PCT/US2007/086754.
Lauterjung, et al., Gitews-German-Indonesian Tsunami Early-Warning System, Zweijahrebericht, 2004-2005.

* cited by examiner

*Primary Examiner*—Scott A Hughes

(57) ABSTRACT

Seabed sensor units, systems including same, and methods for acquiring seabed data are described, one seabed sensor unit comprising a base, the base containing at least one sensor able to detect a seismic signal, electronics comprising a clock and one or more electronic components enabling the sensor to communicate seismic data to one or more memory modules, and a local autonomous power source. This abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

23 Claims, 3 Drawing Sheets

APPARATUS, SYSTEMS AND METHODS FOR SEABED DATA ACQUISITION

BACKGROUND OF THE INVENTION

1. Field of Invention

The present invention relates to the field of marine seabed data acquisition, which may be seismic or electromagnetic data. More specifically, the invention relates to apparatus and systems, and methods of using same for seabed seismic and/or electromagnetic data acquisition using, among other features, one or more autonomous seabed sensor units.

2. Related Art

Seabed seismic acquisition aims to capture the acoustic and elastic energy that has propagated through the subsurface. This energy may be generated by a surface source such as an airgun or airgun array, also known as a source array. The airgun array produces a pressure signal that propagates through the water column into the subsurface. Here acoustic and elastic waves are formed through interaction with the geologic structure in the subsurface. Acoustic waves are characterized by pressure changes and a particle displacement in the direction of which the acoustic wave travels. Elastic waves are characterized by a change in local stress in the sediment and a particle displacement, which is essentially in the same plane as the wavefront. Acoustic and elastic waves are also known as pressure and shear waves. Shear waves may not propagate in water. Acoustic and elastic waves are collectively referred to as the seismic wavefield.

The structure in the subsurface may be characterized by physical parameters such as density, compressibility, and porosity. A change in the value of these parameters is referred to as an acoustic or elastic contrast and may be indicative of a change in sedimentation, including sediment layers, which may contain hydrocarbons. When an acoustic or elastic wave encounters an acoustic or elastic contrast, some part of the waves will be reflected back to the surface and another part of the wave will be transmitted into deeper parts of the subsurface. The elastic waves that reach the seabed will not propagate back into the water column and hence may only be measured by motion sensors (measuring displacement, velocity, or acceleration, such as geophones, accelerometers, and the like) located on the seabed. The pressure waves are usually measured by hydrophones.

The measurement of both acoustic and elastic waves at the seabed may be used to create a detailed image of the subsurface including a quantitative evaluation of the physical properties such as density, compressibility, porosity, etc. This is achieved by appropriate processing of the seismic data.

The seismic wavefield at the seabed may be measured by sensor units that contain one or more hydrophones and one or more displacement sensors (for example: geophones or accelerometers). These sensor units typically also contain the electronics needed to digitize and record these signals. In one known embodiment, the sensor units are connected to a seabed seismic cable, which again is connected to a recording instrument on a surface vessel/survey vessel or other surface facility such as a platform. The seabed seismic cable provides electric power and the means for transferring the recorded and digitized seismic signals to the recording instrument. A deployment vessel (or other means such as seabed ploughs or seabed tractors) deploys the seabed seismic cable on the seabed. The cable may be deployed on the seabed surface or trenched below the seabed surface. In the latter case a trenching apparatus such as water jet, plough or similar, is used to create a narrow trench in the seabed of the required depth (typically 50 cm-1 m) in which the cable with inventive sensor units is placed.

In another known embodiment, the seabed sensor unit may contain sensors, digitizing electronics, a battery, memory and clock. The sensor unit is placed on the seabed either by an autonomous or remotely operated underwater vehicle (ROV), or by any other means of transport such as conveyor belt system or simply dropped from the sea surface. The seabed sensor unit continuously records seismic data for the duration of deployment. The batteries and memory that are included in the seabed seismic sensor unit must be of sufficient capacity for the expected length of seismic survey period (typically 4 weeks or more). In current practice, such as exemplified by published patent application WO2005071442, once the seismic survey is completed, the seismic sensor units, or at least the portion thereof containing the data are physically retrieved. This is usually achieved by ROV or simply by use of pop-up buoys that brings the sensor unit to the surface. The recorded data is transferred to a main computer system and the batteries are recharged for a next deployment. One advantage of seabed seismic sensor units is flexibility. In principle they may be placed on the seabed at any desired location or in any desired pattern. However, deployment of seabed seismic sensor units is relative slow and units are quite costly, and for these reasons the placement of seismic sensor units on the seabed is usually sparse with several 100 m between two sensor units in any direction. The sensor units may be positioned in regular lattice-like patterns or in pseudo-random patterns.

One particular application of seismic data acquisition is referred to as "time-lapse" or 4D seismic. In time-lapse seismic, a seismic image of the subsurface is made at two or more instances separated by time (lapses). A comparison of these images is used to infer changes in subsurface properties that may be tied to, for example, the production of hydrocarbons, or the injection of water or gas. The time-lapse seismic method is well established and documented for pressure wave recordings in which the seismic measurements are made with hydrophones that are built into seismic streamers towed behind a seismic vessel. The first seismic survey is usually referred to as the "baseline" survey, while any subsequent repeat surveys are usually referred to as monitor surveys. In order to minimize any artifacts in the differences between seismic images from successive lapses, the monitor surveys are usually (but not necessarily) acquired with identical measurement configurations. In addition, vessel, streamer, and/or source array steering may be used to reposition the seismic source and seismic sensors (hydrophones) to the same locations as on the baseline survey. Unlike conventional systems in which the accuracy of the hydrophone locations degrades between acoustic positioning sensor units, Q-Marine technology, available from WesternGeco LLC, delivers consistent accuracy down the full length of the streamers. This improved receiver positioning accuracy translates into improved retention of high frequencies in the seismic dataset. And higher frequencies translate into improved vertical and lateral resolution. A survey vessel known as a Q-Technology™ vessel may conduct seismic surveys towing multiple, 1000-10,0000-meter cables with a separation of 25-50 meters, using the WesternGeco proprietary calibrated Q-Marine™ source. "Q" is the WesternGeco proprietary suite of advanced seismic technologies for enhanced reservoir location, description, and management.

For seabed seismic surveying, the application of time-lapse seismic is relative new. This is mostly due to the problem of repositioning the seabed inventive sensor units in exactly the same location as for the monitor survey and ensuring a consistent coupling of the inventive sensor unit with the seafloor sediment. Any changes in coupling at a later deployment or changes in position will be manifest in the seismic image and hence compromise the interpretation of the time-lapse differences. The only accepted solution that has been commercially available to date is using permanently deployed seabed seismic cables. In this case, a seabed seismic cable is not retrieved from the seabed between successive seismic surveys. For safety reasons, usually but not necessarily the seabed seismic cable is trenched into the seabed. This approach has been used on several prospects to date. The problem with this solution is that it is very costly, inflexible and in-situ repair of malfunctioning equipment is not possible without compromising the coupling integrity.

In theory, seabed seismic sensor units may also be used for time-lapse seabed seismic monitoring, but since the seismic sensor units, or at least portions thereof containing the data, must be retrieved after every survey, this approach is impractical for short time-lapses (typical 3 months between each survey). On redeployment the sensor unit has to be put back into its previous position. This is not unachievable with today's technology, but the major draw back is that the soil parameters at its place of origin have likely changed since last installation and hence it will be close to impossible to repeat the same coupling of the sensor unit to the seabed as during the last lapse. This will again introduce artifacts in the time-lapsed seismic image.

Semi-autonomous seabed seismic sensor units are currently commercially available. However, they suffer from several deficiencies—in particular with respect to power consumption. This means that their batteries consume a large volume and weight of the sensor unit. Also, these sensor units must be retrieved from the seabed after each seismic survey in order to use the seismic data that has been collected. Such a sensor unit is described in U.S. Pat. No. 7,124,028.

Another known system is described in published patent application WO 2005071442 A2, which discloses a seabed seismic sensor unit with a permanently deployed base and a retrievable electronics/battery/memory unit.

There has been a long-felt, but as yet unmet need in the marine seabed seismic and electromagnetic data acquisition industries to overcome the limitations of seabed sensor units for time-lapse seismic surveying, in particular in a mode in which the sensor units are left on the seabed between surveys. To date, this is only possible by costly permanently deployed seismic cables on the seabed. The seismic sensor units referred to in WO2005071442 A2 address the time-lapse coupling problem by leaving the node base coupled to the seabed, but only allow data retrieval by removing a substantial part of the seabed node. The present invention addresses and provides solutions to one or more key limitations of seabed seismic cables, seabed seismic sensor units, and electromagnetic sensor units, namely cost, flexibility, continuous power and data transfer. It would be advantageous if electromagnetic (EM) measurements and or surveys could be made using a sensor unit that offers continuous power and data transfer features. It would further be advantageous if sensor units were available having these power and data transfer features and able to collect both EM and seismic data, either simultaneously or sequentially, and/or perform one or more seismic and EM surveys.

SUMMARY OF THE INVENTION

In accordance with the present invention, apparatus, systems and methods for seabed data acquisition are described in which one or more entirely autonomous seabed sensor units are employed.

As used herein the phrase "autonomous" means the seabed sensor units may be used in an initial or baseline survey, and remain on the seabed for an indefinite time period during which one or more subsequent seismic, EM, or both seismic and EM surveys may be performed using the sensor units (time-lapse seabed data acquisition), which may entail time periods ranging from 4 weeks up to 5 years or more, and are self-sufficient on terms of power needs during that time period.

As used herein the term "seabed data" means data selected from EM data, seismic data, and both types of data, while the term "sensor unit" means units able to collect, transfer and communicate seabed data during one or more data surveys.

The inventive sensor units, and systems and methods employing the inventive sensor units, reduce or overcome problems using seabed cables and previously known seabed sensor units, are less expensive, more flexible in terms of data transfer, deployment, and retrieval, and use less power than previously known methods and systems. Apparatus, systems, and methods of the invention allow seabed data transfer to the surface and between sensor units, and may be used to collect marine seismic and/or EM data, for example 3-D and 4-D marine seismic and/or EM data, such as during exploration for sub-sea hydrocarbon-bearing reservoirs, or monitoring existing reservoirs. Electromagnetic signals may be used to transfer data to and/or from the sensor units, to transmit power, and/or to receive instructions to operate the sensor units.

A first aspect of the invention is a seabed seismic sensor unit comprising a base, the base supporting:
- at least one sensor able to detect signals selected from seismic signals, EM signals, and both types of signals (for example one or more hydrophones, geophones, motion sensors, and EM sensors);
- an electronics unit comprising one or more electronic components enabling the at least one sensor to communicate data to one or more memory modules;
- a clock, which may be a high-precision clock, for synchronizing operation of the sensor unit;
- an autonomous power source (one or more batteries, capacitors, or the like, for example); and
- a local data transfer unit allowing data communication between the sensor unit and other sensor units, or to an underwater vehicle (which may employ a data transfer/docking module electronically connected to the power source and memory unit).

In certain embodiments the base may comprise an internal compartment in which one or more of the other components are enclosed. In other embodiments, one or more memory modules and other components, such as one or more antennae, may be attached to an external surface of the base. In certain embodiments, memory modules may exist in a memory unit. In other embodiments, memory modules may accessed without physically transporting any memory module to the surface, i.e., in some embodiments all memory modules remain with the inventive sensor unit during and after seabed data is transmitted to the surface, or to an AOV/

ROV. Alternatively, one or more memory modules making up a memory unit may be physically removed from the memory unit while the sensor unit continues to operate, and data transferred by retrieving one or more memory modules, such as by an AUV or ROV, or by sending a signal to the sensor unit to release one or more memory modules and thereby float them to the surface. The inventive sensor units may be used in 3-D and 4-D seabed data acquisition, wherein the seabed data may be selected from seismic data, EM data, and both seismic and EM data.

Other sensor embodiments may comprises:
- at least one sensor able to detect signal data selected from seismic signal data, EM signal data, and both types of signal data;
- an electronics unit comprising one or more electronic components enabling the signal data to be communicated to one or more memory modules in the sensor unit, the memory modules releasable from the sensor unit individually via a remote signal;
- an autonomous power source for powering the electronics unit;
- a receiver unit allowing reception of command signals to trigger release of one or more memory modules as desired; and
- a clock for synchronizing operation of the seabed sensor unit.

Certain seabed seismic sensor unit embodiments of the invention may further comprise one or more components fulfilling one or more of the following functions:
- autonomous power generation on or near the seabed; and/or
- homing or recognition, such as by employing a homing component on or in the sensor unit generating a homing signal and forming part of a navigation system for an underwater vehicle (AUV or ROV).

One component may be used to fulfill one or more functions. For example, the data transfer unit (also referred to herein as communication network components) may be used for one or both of positioning (homing in) of the ROV/AUV, as well as for broadcasting messages between the sensor units. The messages may be time tagged and used for distance measure and clock calibration. The communication network may also be used for transmission of status information, quality control (QC) as well as to send smaller amount of data to a HUB with connection to the surface.

A second aspect of the invention are systems including one or more seabed sensor units of the invention. Systems within the invention include those wherein the inventive sensor units may be left on the seabed between seismic and/or EM surveys in order to perform time-lapse seabed seismic and/or EM data acquisition, due in part to sensor units of the invention employing batteries that consume a much smaller volume and weight of the sensor unit, compared with previously known seabed sensor units.

As used herein, "survey" refers to a single continuous period of seismic data acquisition, EM data acquisition, or both (which may occur simultaneously, sequentially, or with some degree of time overlap), over a defined survey area; multiple surveys means a survey repeated over the same or a same portion of a survey area but separated in time (time-lapse). Thus a "survey" may include a "seismic survey", an "EM survey", or both. In the context of the present invention a single seismic survey may also refer to a defined period of seismic acquisition in which no controlled seismic sources are active (which also may be referred to alternatively as passive acoustic listening, passive seismic listening or micro seismic measurements).

The inventive sensor units themselves, nor any physical component thereof, need be retrieved from the seabed after each survey in order to obtain data, although in certain embodiments one or more memory modules of the memory unit may be physically retrieved via a remote signal triggering release of a memory module so that it floats to the surface.

In certain sensor unit and system embodiments, power may be generated at the seabed or in the water column, or both, by exploiting techniques related to energy harvesting techniques selected from, for example, salt water batteries, ocean currents, wave action, and combinations of these.

Systems of the invention may use the technology of underwater contact-less data transfer through, for example, induction, as previously known with certain steerable birds for streamer steering. Other contact-less communication systems may be used in systems of the invention, for example laser systems (optics) and low frequency radio. Systems of the invention may comprise an underwater acoustic communication network comprising acoustic emitters, which, in conjunction with sensor units of the invention, may be used to send limited quality control (QC) data to the surface, as well as communicate commands in one or both directions (from sensor units to the surface, from the surface to one or more sensor units, and variation of both of these).

Systems of the invention may comprise combinations of low-cost inertial navigation systems (on an ROV or AUV) with a homing device on one or more sensor units, greatly reducing errors in time-lapse surveys attributable to (attempted) replacing of seabed sensors in the places they were during a previous survey. Previous to the systems of the present invention, many known operational scenarios employed AUV/ROV's to place recording devices such as seabed sensor units. The navigational guidance available for AUV/ROV's is typically based on a combination of inertial electronics systems and acoustic ranging, either long baseline or short baseline methods. All methods suffer to some extent due to the refraction of the acoustic signal along the propagation path and drift of the inertial sensors. The degree of error resulting from acoustic positioning varies but rarely gives better than 5 meters accuracies in deep water, e.g., 1 km or more. In systems and methods of the invention, knowing the exact positioning of the inventive sensor units, and using the acoustic network for communications, the refraction during propagation effect may be corrected for despite daily and/or seasonal variation in the speed of sound in the water column. Systems of the invention may comprise one or more ROV/AUV's, surface vessels, tethers, and the like, and may coordinate surveys with seabed and/or towed seismic cables.

A third aspect of the invention comprises methods of acquiring seabed seismic data using a seabed sensor of the invention, including time-lapse seabed seismic data acquisition, one method comprising:
a) initiating an acoustic signal through a water column and into a seabed from a seismic source;
b) measuring reflected seismic signals at one or more seabed sensor units, at least one of the sensor units comprising a sensor unit of the invention positioned at original locations on the seabed;
c) retrieving seismic data from one or more of the sensor units of the invention employing a hub (for example an ROV, AUV, or tether) while leaving the sensor units of the invention intact on the seabed in their original locations, or alternatively retrieving one or more memory modules of the memory unit; and
d) optionally, repeating steps (a) through (c).

Other methods of the invention include using one or more seabed sensor units of the invention in passive listening surveys (where no acoustic source is used) and EM surveys, where one or more of the sensor units comprises one or more EM sensors.

Sensor units, systems including same, and methods of using sensor units and systems of the invention allow more efficient seabed data acquisition (including time-lapse) than previously known sensor units, systems, and methods. These and other features will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

Figure 1:
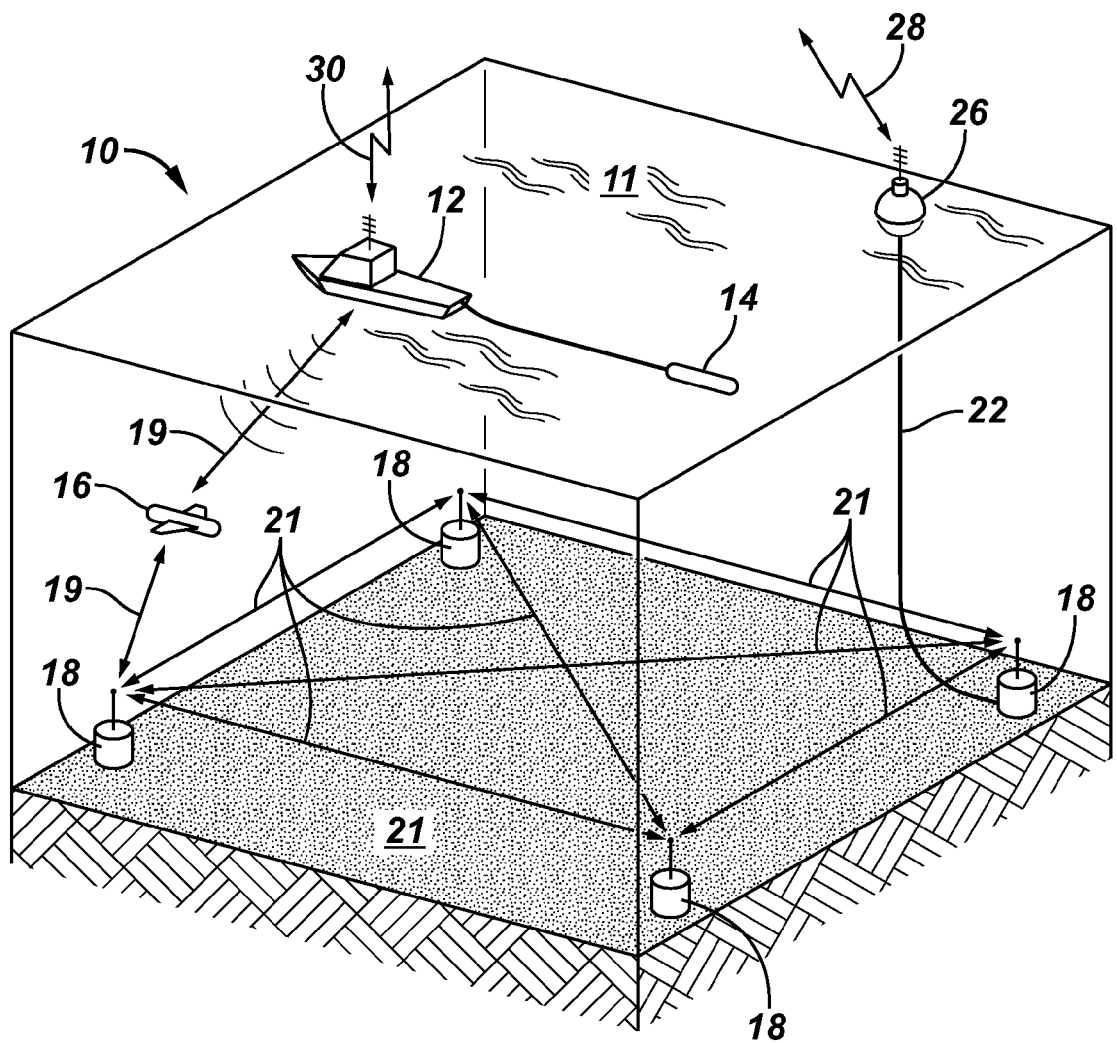
FIG. 1 illustrates a simplified schematic perspective view of a system of the invention.
Figure 2:
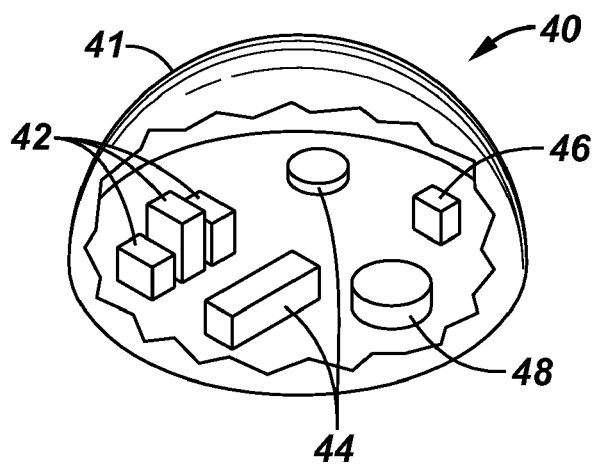
FIGS. 2-6 illustrate perspective views of five embodiments of autonomous seabed sensor units in accordance with the invention.
Figure 3:
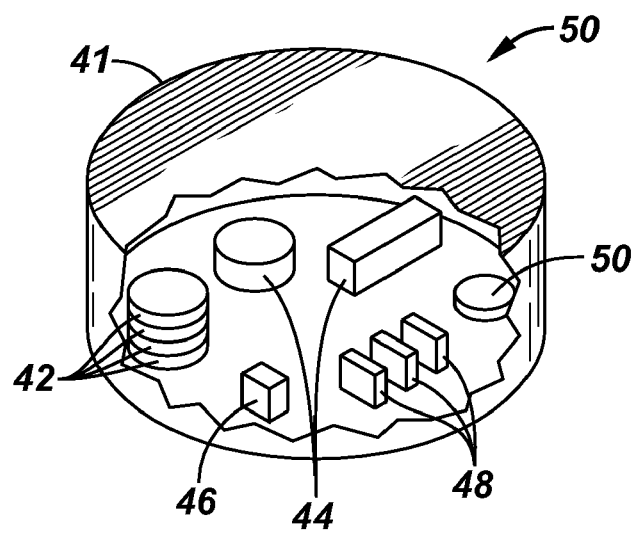
Figure 4:
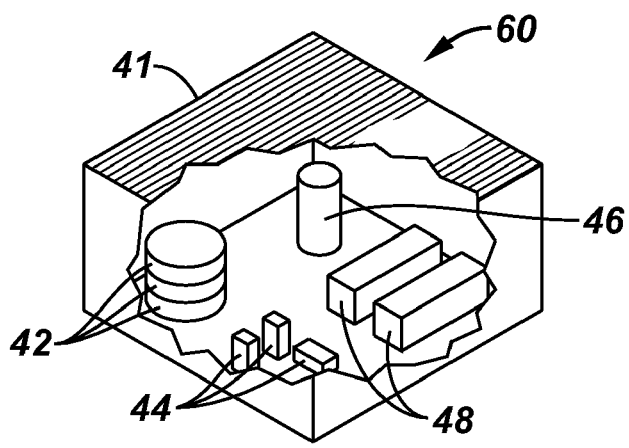

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to seabed seismic sensor units, systems comprising same, and methods of using the inventive sensor units and systems. A primary feature of the invention is how to obtain data using a permanently (or semi-permanently) deployed sensor unit and how the sensor unit can function for a long time period being self powered. The local data transfer may be performed by various methods which do not involve removing any component from the sensor, or just by taking one or more memory modules out one at a time, or some combination of these variations.

The sensor units, systems, and methods of the invention may be used for acquisition of seabed seismic and/or EM data, in particular time-lapse seabed seismic data, by placing one or more sensor units of the invention permanently or for a period spanning at least two seismic surveys over the same survey area. At present there are two known means by which seismic data may be recorded at the seabed: a) either by sensor units which are attached to a cable deployed on the seabed by a deployment vessel or other deployment means such as a seabed plough or seabed tractor, or b) sensor units which are contained in so-called autonomous seismic sensor units. The sensor units may be placed on the seabed by either dropping them from the sea surface or by remotely or autonomously operated underwater vehicle. In these previously known methods the sensor units have to be recovered after each seismic survey. For this reason only a cable-based system is at present suitable for permanent deployment. For time-lapse seismic purposes, this is ideal because permanent placement guarantees position and coupling stability. However, cable-based systems and their deployment are very costly. Seabed seismic sensor units maybe replaced for each seismic survey, but there remains uncertainty with what accuracy they may be placed in exactly the same position and whether a consistent coupling of the sensor unit to the seabed may be achieved. Also, repeat deployment of seabed seismic sensor units is time consuming and costly as well.

In the present invention we describe inventive sensor units, systems, and methods which solve or reduce problems associated with cable-based systems, or previously known sensor unit-based systems for acquisition of time-lapse seabed seismic data, namely cost, permanent placement, power and data transfer. Certain embodiments of sensor units may be employed in passive listening systems, and systems adapted to sense EM signals. Certain sensor units may be configured to sense both seismic wavefield and EM signals.

Seabed sensor units within the invention may include, in addition to measurement sensors, a high-precision clock, low-power electronics, and long-term battery and memory components, one or more of the following additional features: a) an autonomous underwater power generating unit which will provide the power to charge the batteries in the sensor units without being reliant on power charge from external means; b) a data transfer/"docking-module" which allows for data transfer to/from the autonomous sensor unit, either using an underwater vehicle (ROV or AUV) which will locate the inventive sensor units on the seabed and dock with for transfer of the recorded seismic data, and/or a data transfer cable attachable to and detachable from the inventive sensor units by an ROV or AUV; c) a guidance component, such as a homing transmitter, one or more passive EM reflectors, and the like, which will be used to guide the underwater vehicle to the inventive sensor units on the seabed; d) an acoustic emitter, receiver or transponder, allowing an acoustic network between the sensor units and one or more AUV or ROV, making it possible to calibrate the AUV or ROV navigation system relative to the fixed sensor unit position network on the sea bottom, and transmit status information and commands between the different sensor units; and/or e) surface to sensor unit communications components allowing a sensor unit to serve as a HUB, serving as a relay station between the acoustic network and the ship on the sea surface. The HUB may either be a sensor unit with HUB features sitting on the seafloor with cables to the surface, one or more ROV/AUV's in the water performing the same features, or some combination thereof.

An important feature of the seabed sensor units of the invention is that it is not necessary to retrieve the sensor units, other than for possible repair in case of a failure, for example. One or more memory modules may be removed. Advances in memory storage and low-power electronics available only recently allows for a low-cost miniaturized inventive sensor unit. The data transfer/docking module allows for efficient transfer of the recorded seismic data to an underwater vehicle, a surface vehicle (via a tether), or some combination thereof, immediately or any time subsequent to a seismic survey. If one or more sensor units of the invention include the guidance feature, for example a homing beacon component, the underwater vehicle may be equipped with lower-cost navigation components. If used, the guidance components (whether homing beacon or other components discussed herein) replace an underwater acoustic navigation system and may yield an overall more accurate navigation system. Each inventive sensor unit may have a unique homing signature, which allows the underwater vehicle to detect which inventive sensor unit it is approaching.

The inventive sensor units may remain on the seabed between seismic surveys. During idle periods, an underwater autonomous power generation component, if present, will generate enough power to recharge the autonomous power source, which may be one or more rechargeable batteries, one or more capacitors, and the like. Batteries and capacitors may be based on any chemistry as long as they are self-sufficient for the duration intended, which may be months to years. Batteries or battery cells such as those known under the trade designation "Li-ion VL45E", available from SAFT, Bagnolet, France, may be used. Another alternative is to use capacitors as storage devices for power. Capacitors are smaller and have higher storage capacity, such as discussed in the publication "Researchers fired up over new battery", MIT News Office, Feb. 8, 2006, accessed Nov. 7, 2006 at http://web.mit.edu/newsoffice/2006/batteries-0208.html, incorporated herein by reference. Furthermore, sensor units of the invention may be placed in "sleep" mode for energy conservation during periods of no operation.

"Underwater autonomous power generation" components are to be distinguished from "autonomous power sources." As used herein, the phrase "autonomous power generation" is an optional, but highly desirable feature for sensor units of the invention, and refer to one or more components allowing the autonomous power source or sources to be regenerated, recharged, or replenished, either fully or partially, in order that the seismic sensor unit may remain on the seabed between seismic surveys. While in theory this may be possible through power brought to the seismic sensor unit by means of a remotely operated vehicle, this is a slow and cumbersome process. Instead, the sensor units of the present invention may include a means of extracting power from their local environment, sometimes referred to as energy harvesting. Examples of suitable autonomous power generation components include those which may use sea current energy, which may be transformed into electrical energy by some known means of energy conversion. See for example "Compact Tidal Generator Could Reduce the Cost of Producing Electricity from Flowing Water", Engineering and Physical Sciences Research Council, Jun. 14, 2006, ScienceDaily.com. Alternative technology of local power generation may be based on salt-water battery principles, such as discussed in U.S. Pat. No. 5,665,487, incorporated herein by reference. See also sea water batteries such as those known under the trade designation SWB600, available from Kongsberg Maritime, Kongsberg, Norway. Another alternative is to use vibrations from the seafloor or from acoustic signals from the water as drivers, such as discussed in U.S. Pat. No. 5,568,005; see also Ferro Solutions, Inc., "Energy Harvester" product sheet (2004), accessed at http://www.ferrosi.com/files/FS_product_sheet_wint04.pdf on Nov. 7, 2006; and "Vibration-powered sensor harvests structural shakes, stores data for later readout", Sandia Lab News, Vol. 54, No. 8, Apr. 19, 2002, accessed Nov. 7, 2006 at http://www.sandia.gov/LabNews/LN04-19-02/key04-19-02_stories.html, also incorporated herein by reference. The autonomous power sources (batteries, for example) may be recharged during periods between seismic surveys which could be anywhere between a few months and one to two years.

In order to have synchronized data from sensor unit to sensor unit and/or to extract QC information to the surface, some or all of the sensor units in any system of the invention may be acoustically connected in an underwater acoustic telemetry network. The network may communicate with the surface with either a dedicated acoustic HUB station located on the seabed and interfaced with a cable to a buoy or vessel on the sea surface, or by including acoustic receivers in an AUV/ROV serving as a HUB station to the surface. A buoy may be connected to the survey vessel through radio communication. The communication on this link may be bi-directional. FIG. 1 illustrates schematically an overview of one system embodiment 10 of the invention in a sea or other body of water 11 as described above, illustrating a surface seismic vessel 12, towing a seismic source 14. Vessel 12 may communicate acoustically or using EM signals 19 with an underwater vehicle 16 (ROV or AUV), which in turn may communicate acoustically or using EM signals 17 with any sensor units of the invention 18 secured to a seabed 20. It will be understood that the terms "sea" and "seabed" are used generically to include seas, oceans, lakes, bays, rivers, channels, and the like. Double-headed arrows 21 indicate an acoustic network between sensor units 18. In this embodiment one of the sensor units 18' also serves as a HUB connected using an umbilical tether 22 to a buoy 26, which may communicate using EM signals 28, 30, with vessel 12.

Figure 5:
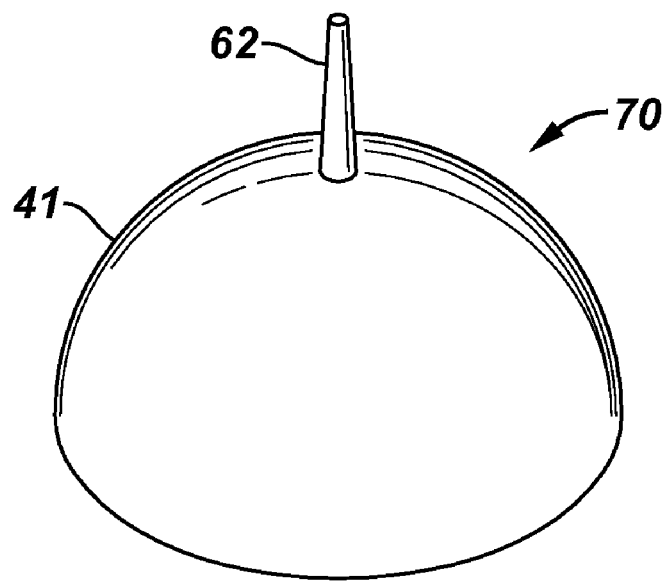
Figure 6:
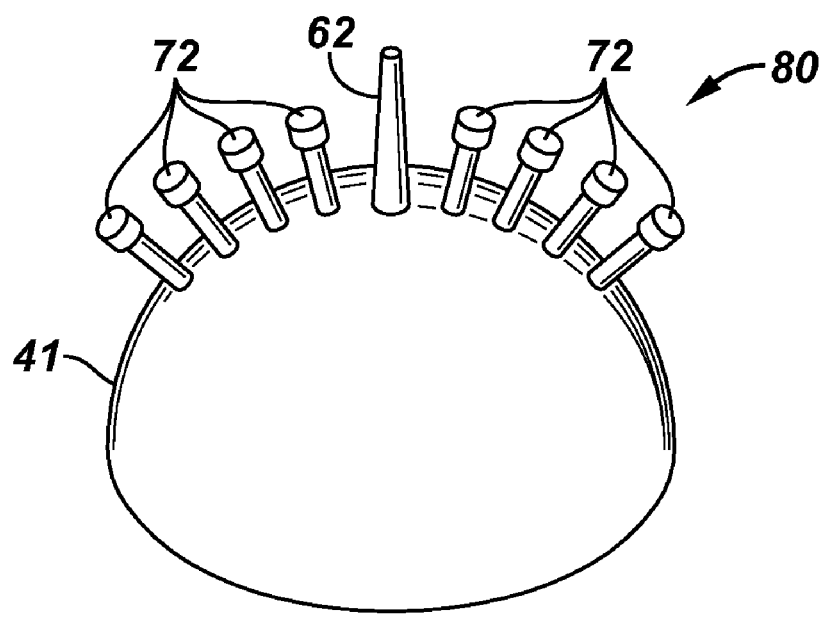

The central component of the invention is a fully autonomous sensor unit, five non-limiting embodiments of which are illustrated schematically in FIGS. 2-6. Embodiment 40 illustrated in FIG. 2 includes a dome-shaped base 41, memory modules 42, sensors 44, high-precision clock 46, and an autonomous power supply 48. Embodiment 50 illustrated in FIG. 3 includes a cylinder-shaped base 41, memory modules 42, sensors 44, high-precision clock 46, an autonomous power supply 48, and an autonomous power generation unit 50. Embodiment 60 illustrated in FIG. 4 includes a rectangle-shaped base 41, memory modules 42, sensors 44, high-precision clock 46, and an autonomous power supply 48. FIG. 5 illustrates a sensor unit embodiment 70 having a communication mast, which may be an acoustic pinger, a coil for induction coupling (AUV or ROV docking), and/or an antenna for a radio or other frequency communications link. Memory modules, sensors, high-precision clock, and an autonomous power supply would also be present but are not illustrated in FIG. 5. Embodiment 80 illustrated in FIG. 6 includes a plurality of memory module 72 that may be individually removed/released from their connection with base 41. Sensors, high-precision clock, and an autonomous power supply would also be present but are not illustrated in FIG. 6. Embodiment 80 may also include memory modules internal of base 41, but are not illustrated.

Sensors useable in the inventive sensor units may be individual sensors or a package of two or more sensors. One suitable sensor package is that known under the trade designation "4C Sensor" available from WesternGeco LLC, comprised of three geophones or accelerometers and one hydrophone.

Sensor units of the invention may also comprise an electronics module having ultra-low power requirements, and may include a high-precision clock, an analog-to-digital converter, power management software and hardware, and a control module for data input/output.

The material of base 41 may be any corrosion-resistant material, such as plastics, composites, and the like.

Optionally, sensor units within the invention may comprise one or more ROV/AUV coupling guides positioned randomly or non-randomly around the periphery of the sensor unit.

Seabed sensor units of the invention may also include an acoustic transponder for occasional surface communication. However, by making use of state of the art low-power electronics, the power consumption of the inventive sensor units may be reduced significantly, in some embodiments at least by a factor of 10. This in turn reduces the need for battery capacity greatly. Since batteries traditionally take up most of the weight and volume of seabed sensor units, the sensor units of the invention may be made much smaller, lighter, lower cost, and longer lasting than what was possible until present. Like any seabed sensor unit today, this unit may be placed on the seabed by an AUV or ROV, by a conveyor belt system or by simply dropping the unit from the sea surface. In instances where the inventive sensor units are to be physically planted on the seabed, inventive sensor units may comprise one or more physical features, such as "spikes", to allow the units to be planted firmly in the seabed sediment.

The total power consumption of the digitizing electronics within an inventive sensor units is expected to not exceed 50 mWatt. In addition, by using low-power memory (for example flash EPROM), the total power consumption of the complete inventive sensor units is not expected to exceed 150 mW at any time. This is at least a factor of 10 less than with current technology used in seabed sensor units. The battery capacity that is needed to provide power to an inventive sensor unit for a typical seismic survey period of six weeks is only 150 Wh. Rechargeable Li-Ion batteries may provide approximately 350 Wh/l and 150 Wh/kg, hence the total battery volume and weight is expected approximately 0.4 liter and 0.6 kg.

Data that is recorded by the seabed sensor units of the invention may be transferred to a central recording/computer system. Since in any given seismic survey no permanent seabed seismic cables may be in place, the seabed sensor units of the present invention may include a docking module attached or connected to the seabed seismic sensor unit. Recorded data may be collected by an AUV or ROV after completion of the seismic survey. In these embodiments the underwater vehicle locates seabed sensor unit using a homing beacon signal, for example. The underwater vehicle may position itself such that it may connect with a data-transfer docking module on the sensor unit using a simple mechanical device such as a hook, or a mechanical pinchers or mechanical hand. Once some or all data is transferred, the underwater vehicle will "decouple" from the sensor unit and set course to a next seabed sensor unit or return to the surface. In other embodiments it may be desirable to remove and transport one or more memory modules to the surface, although in most embodiments of the invention the memory modules may accessed without physically transporting the memory unit to the surface. For example, one might equip an inventive sensor unit with N memory modules for N surveys. In these embodiments, for example, for each survey one memory module is taken out by ROV/AUV, or a remote signal is sent to the sensor unit and a memory module popped out and allowed to come to the sea surface. Both methods may be used. Although it is possible to use a wet-matable electrical connection, most embodiments of the present invention use one or more of inductive coupling, low frequency radio, or laser light to achieve data transfer, i.e., no electrical connections by means of wiring or connectors are needed in most embodiments. In certain embodiments data transfer may be achieved through multiple channels and/or by multiple methods in order to increase the speed and/or amount of the data transmission. The electrical power needed for data transfer may be provided by an underwater vehicle and transferred to the inventive seabed sensor unit by induction.

A navigation system for the underwater vehicle may be based on a recognition or homing beacon device on the inventive seabed sensor unit. The underwater vehicle must locate the seabed sensor unit. Traditionally, costly acoustic and inertial navigation systems are used to accomplish the underwater navigation and mission control of such devices. In certain embodiments, a "recognition" or homing system may be integrated with the seabed sensor unit. This could be an acoustic transponder or passive reflector, for example. Homing systems are well known in the military but until now have not been known to be used for the purposes of locating seabed sensor units. Inventive sensor units may include an acoustic signal converter that allows an acoustic signal of one frequency to be re-transmitted at another frequency. Since the location of the seabed sensor unit as it is deployed in its original location is known (within a few meters accuracy), the seabed coordinates of the sensor unit may be programmed into the mission profile of an underwater vehicle. A relatively simple and low-cost inertial system may then be used to navigate the vehicle towards a desired seabed seismic sensor unit. This system may be relatively inaccurate because the homing transponder or reflector will only act as a guide for the vehicle to steer towards the actual location of the sensor unit on the seabed. However, once the actual location of the sensor unit is known, the position of the vehicle may be updated with the known and pre-programmed positions of the sensor unit allowing the inertial system to be re-calibrated. In addition, the travel time measurements of acoustic signals from other sensor units with known positions would also give valuable calibration information to the various axes of the inertial system. Several technologies are available for such a recognition device. Radio frequency identification (RFID) readers with varying amounts of range include passive, semi-passive, and active transponders, and acoustic reflectors or pingers that respond when they receive a unique signal (as used for example in automatic underwater release mechanisms). For repeated surveys it is also possible to use one or more of inertial navigation, acoustic networks (as outlined herein) and bathymetric maps for the navigation. Such systems exist but are not known to have been used in such an application.

A communication network between seabed sensor units may be used both for positioning of the ROV/AUV as well as to broadcast messages between the sensor units, between the sensor units and the surface vessel, and combinations thereof. These communication networks may be used for transmission of status information, QC, as well as to send smaller amount of data to a HUB with connection to the surface. The transmission protocol may allow data going from the sensor units to the surface or vice versa. One or several of the sensor units may have a HUB interface making it possible to have at least one such device in the spread. This communication link between the surface and the sensor units may also be used for data synchronization. Even though the system as outlined in FIG. 1 has a cable 22 between the sensor unit/HUB 18' and buoy 26 on the surface, the invention is not limited to cable as a communication channel. In other embodiments of the invention one or more AUVs or ROVs may be used as relay stations for other types of communication equipment such as for example: radio, lasers or acoustics. The location system will depend on the deploying vehicle being able to detect the seabed location device. This requires the vehicle to be within range of the device. For example, if the range of the device is 30 meters, the deployment vehicle must be able to navigate by another, perhaps conventional acoustic means to within 20-50 meters of the locator. If the range of the location device is hundreds of meters, the deployment vehicle must be able to home in on the device by having a navigation system that seeks the strongest signal.

In addition, the mission control of the underwater vehicle may be optimized taking into consideration local sea currents. These may be measured in situ by a current meter. Seabed currents are a significant limitation for the efficiency of underwater vehicles. However, since seabed sensor units are usually distributed on the seabed in a regular or pseudo regular lattice-like grid, and since the order by which the sensor units are visited by the underwater vehicle is essentially unimportant, the path of the underwater vehicle may be designed and tuned such that it follows the direction of the current where ever possible, minimizing power consumption and traverse time.

The seabed sensor units of the invention do not necessarily comprise all of the abovementioned features. For example, it may well be possible to recharge the batteries of the sensor unit directly from an underwater vehicle. This is particularly the case when the underwater vehicle is connected with a tether to surface (ROV). In case of wired recharge it will also be desirable to perform the data transfer through the same connection as the recharge is performed. Also, it may be possible to decouple an inventive sensor unit from a permanently placed base 41 and retrieve the inventive sensor unit while leaving base 41 in place. In these embodiments, a key feature of the inventive sensor units is the homing/communication system for navigation of the underwater vehicle for accurate location of base 41, for retrieving and repositioning of inventive sensor units as well as to send the status information, etc., within the sensor unit network. Yet other embodiments may comprise having the memory unit with recorded data separated into two or more different modules of memory, each module being connected to an acoustic release mechanism so when the system is released a specific set of data associated with a specific memory module is decoupled from the inventive sensor unit and brought to the surface by an underwater vehicle.

Methods of using the seabed sensor units and systems of the invention may include measurement, calculation and other sub-systems useful in implementing methods of the invention. Current vector information, GPS coordinates of one or more buoys and nearby receivers, and the like, may optionally be supplied to a calculation sub-unit via wire or wireless transmission. Calculation units may include software and hardware allowing the implementation of one or more equations, algorithms and operations as required, as well as access databases, data warehouses and the like, via wire or wireless transmission. The direction and speed of the water flow past a sensor unit, (i.e., current relative to the sensor unit) may be determined within a common absolute reference frame, such as the World Geodetic System—1984 (WGS-84).

The initial position to within few meters of accuracy of one or more seabed sensor units of the invention may be determined for instance by using GPS combined with an acoustic positioning system, such as a short-baseline (SBL) or ultra-short baseline (USBL) acoustic system.

It is within the invention to interface seabed sensor units and systems of the invention with other data acquisition systems and methods of marine data acquisition, such as cable-based systems (seabed and/or towed), and systems using previously known seabed sensor units. As one non-limiting example, where a reliable seabed cable has been operating successfully, one might use that seabed cable and its sensors, and position sensor units of the invention in a grid on one or both sides of the cable.

In certain embodiments, regardless of the acoustic environment, a higher density of seabed sensor units throughout the spread may improve overall operational efficiency by decreasing the distances between the sensor units and the associated degradation of acoustic accuracy. As the seabed sensor units of the invention are lighter, take up less volume, and have power capabilities unknown in previous sensor units, a seismic and/or EM spread may comprise more sensor units of the invention in the same survey area compared to use of previous sensor units. Also, a vessel deploying the sensor units using an ROV or AUV may be able to carry and store more seabed sensor units of the invention, due to their smaller comparable size. The shape of the base of the inventive sensor units is not in itself relevant; the overall shape may be cylindrical, spherical, hemispherical, parallelepiped. Furthermore, the base may be generally flat on its bottom (contacting the seabed), or may comprise one or more spikes or other physical features penetrating the seabed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A seabed sensor unit comprising a base, the base supporting:
    at least one sensor able to detect signal data selected from seismic signal data, EM signal data, and both types of signal data;
    an electronics unit comprising one or more electronic components enabling the signal data to be communicated to one or more memory modules in the sensor unit;
    an autonomous power source for powering the electronics unit;
    a local data transfer unit allowing communication of at least some of the signal data from the one or more memory modules to a device for retrieving data from the one or more memory modules selected from an underwater hub, an underwater vehicle, and both, the local data transfer unit being adapted to perform a seismic data transfer underwater with the device when the device is temporarily docked to the unit and is electronically connected to the power source and the one or more memory modules; and
    a clock for synchronizing operation of the seabed sensor unit.

2. The seabed sensor unit of claim 1 wherein the at least one sensor comprises one or more hydrophones and one or more geophones or accelerometers.

3. The seabed sensor unit of claim 1 wherein the local autonomous power source is selected from one or more batteries, one or more capacitors, and one or more of each.

4. The seabed sensor unit of claim 1 comprising one or more components fulfilling one or more of the following functions: autonomous power generation on or near the seabed; and recognition.

5. The seabed sensor unit of claim 4 wherein the autonomous power generation is performed by a component selected from a salt-water battery, a sea current power conversion module, vibration from either acoustics or ambient natural vibrations, and combination thereof electronically connected to the power source.

6. The seabed sensor unit of claim 4 wherein the recognition function is performed by a component selected from a light reflector, a distinctly shaped component attached to the base, and a component electronically connected to the power source comprising a homing component on or in the sensor unit, the homing component generating a homing signal and forming part of a navigation system for an underwater vehicle.

7. The seabed sensor unit of claim 4 wherein the communication function is performed by one or more communications components electronically connected to the power source.

8. The seabed sensor unit of claim 4 wherein one component, electronically connected to the power source, fulfills two or more of the functions.

9. The seabed sensor unit of claim 8 wherein the one component comprises communication network components which are used for both of positioning (homing in) of an underwater vehicle, as well as for broadcasting time tagged messages.

10. The seabed sensor unit of claim 9 wherein the communication network transmits time tagged information selected from status information, quality control (QC) information, and seismic data to a hub having a physical electronic connection to a surface vessel.

11. A seabed sensor unit comprising a base, the base supporting:
  at least one sensor able to detect signal data selected from seismic signal data, EM signal data, and both types of signal data;
  an electronics unit comprising one or more electronic components enabling the signal data to be communicated to memory modules in the sensor unit, the memory modules releasable from the sensor unit individually via a remote signal;
  an autonomous power source for powering the electronics unit;
  a receiver unit adapted to selectively trigger release of less than all of the memory modules as desired; and
  a clock for synchronizing operation of the seabed sensor unit.

12. A system comprising:
  one or more seabed sensor units stationed on a seabed floor, one or more of the sensor units comprising at least one sensor able to detect signal data selected from seismic signal data, EM signal data, and both types of signal data; an electronics unit comprising one or more electronic components enabling the signal data to be communicated to one or more memory modules in the sensor unit; an autonomous power source for powering the electronics unit; a local data transfer unit and a clock for synchronizing operation of the seabed sensor unit; and
  a hub stationed on the seabed floor to communicate with the local data transfer unit to retrieve seismic data from the one or more memory modules.

13. The system of claim 12 comprising two or more sensor units forming an acoustic network therebetween, the hub transmitting signals between the sensor units.

14. The system of claim 13 wherein the signals are selected from information, commands, data, and combinations thereof.

15. The system of claim 13 wherein the hub transmits signals between the acoustic network and a vessel on a sea surface.

16. The system of claim 12 wherein the one more sensor units comprises one or more components fulfilling one or more of the following functions:
  autonomous power generation on or near the seabed; and recognition.

17. A method comprising:
  a) initiating an acoustic signal through a water column and into a seabed from a seismic source;
  b) measuring reflected seismic signals at one or more seabed seismic sensor units positioned at original locations on the seabed, at least one of the sensor units comprising at least one sensor able to detect seismic signal data; an electronics unit comprising one or more electronic components enabling the seismic signal data to be communicated to one or more memory modules; an autonomous power source for powering the electronics unit; a local data transfer unit allowing communication of at least some of the signal data from the one or more memory modules to a hub; and a clock for synchronizing operation of the seabed sensor unit;
  c) retrieving the seismic signal data from one or more of the seabed seismic sensor units while leaving the sensor units intact on the seabed in their original locations, the retrieving comprising using one of the seabed seismic sensor units as the hub and transmitting the data through a wire connection to a buoy, which in turn transmits the data to a surface vessel; and
  d) optionally, repeating steps (a) through (c).

18. The method of claim 17 comprising repeating steps a) through c) and performing time-lapse seismic data acquisition.

19. The method of claim 17 wherein at least some of the one or more sensor units comprises one or more components fulfilling one or more of the following functions: generating power autonomously on or near the seabed; and recognizing an underwater vehicle.

20. The method of claim 19 comprising the one or more sensor units generating power autonomously using a component selected from a salt-water battery, a sea current power conversion module, a unit sensing vibration from either acoustics or ambient natural vibrations, and combinations thereof.

21. The method of claim 20 comprising repeating steps a) through c) and performing time-lapse seismic data acquisition.

22. The method of claim 19 comprising repeating steps a) through c) and performing time-lapse seismic data acquisition.

23. The method of claim 17 including measuring EM signals at one or more seabed EM sensor units positioned at original locations on the seabed, at least one of the EM sensor units comprising at least one sensor able to detect EM signal data; an electronics unit comprising one or more electronic components enabling the EM signal data to be communicated to one or more memory modules; an autonomous power source for powering the electronics unit; a local data transfer unit allowing communication of at least some of the signal data from the one or more memory modules to a device for retrieving seismic data from the memory modules selected from a hub, an underwater vehicle, or both; and a clock for synchronizing operation of the seabed sensor unit.

* * * * *